US010558553B2

(12) United States Patent
Diao et al.

(10) Patent No.: US 10,558,553 B2
(45) Date of Patent: Feb. 11, 2020

(54) ENABLING NON-BLOCKING RUNTIME APPLICATION DEBUGGING FOR A SINGLE THREADED SERVER ENVIRONMENT (71) Applicant: International Business Machines Corporation, Armonk, NY (US)

(72) Inventors: Xian Feng Diao, Beijing (CN); Shang Xiang Fan, Beijing (CN); Xin Peng Liu, Beijing (CN); Lu Lu, Beijing (CN); Bing Dong Ma, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 81 days.

(21) Appl. No.: 15/365,727

(22) Filed: Nov. 30, 2016

(65) Prior Publication Data

US 2018/0150385 A1    May 31, 2018

(51) Int. Cl.
*G06F 11/36* (2006.01)

(52) U.S. Cl.
CPC ...... *G06F 11/3644* (2013.01); *G06F 11/3664* (2013.01)

(58) Field of Classification Search
CPC . G06F 11/3644; G06F 11/3664; G06F 11/362
See application file for complete search history.

(56) References Cited

U.S. PATENT DOCUMENTS

| 6,106,571 A * | 8/2000 | Maxwell | G06F 11/3644 |
| | | | 714/E11.209 |
| 6,378,125 B1 * | 4/2002 | Bates | G06F 11/3664 |
| | | | 714/E11.209 |
| 6,654,949 B1 * | 11/2003 | Fraenkel | G06F 11/3466 |
| | | | 714/E11.2 |
| 6,708,224 B1 * | 3/2004 | Tsun | G06F 9/4843 |
| | | | 717/127 |
| 8,392,885 B2 | 3/2013 | Stall et al. | |
| 8,589,881 B2 | 11/2013 | Park et al. | |
| 8,972,953 B2 | 3/2015 | Tamm | |
| 9,064,049 B2 * | 6/2015 | Zinkovsky | G06F 11/362 |
| 9,201,759 B2 | 12/2015 | Wintergerst et al. | |
| 10,055,334 B2 | 8/2018 | Lentz et al. | |
| 2005/0034024 A1 | 2/2005 | Alverson et al. | |
| 2005/0050159 A1 | 3/2005 | Suraski | |

(Continued)

OTHER PUBLICATIONS

Mickens, J., Rivet: Browser-agnostic Remote Debugging for Web Applications, Microsoft Research, pp. 1-13.

*Primary Examiner* — Yolanda L Wilson
(74) *Attorney, Agent, or Firm* — Patterson + Sheridan, LLP (57) ABSTRACT Systems, methods, and computer program products to perform an operation comprising non-blocking runtime debugging of an application executing in a single threaded server environment by obtaining a first request from a head of a request queue, processing the first request based on server application code under debugging, triggering, in response to the first request, a debugging procedure, pausing processing of the first request based on the debugging procedure, tagging the first request with an indication that the first request is in debugging, placing the first request back on the request queue in a position behind the head of the queue, storing debug information related to the first request, and executing at least a second request from the request queue while processing of the first request is paused.

12 Claims, 8 Drawing Sheets

(56) References Cited

U.S. PATENT DOCUMENTS

| | | | |
|---|---|---|---|
| 2008/0209405 A1* | 8/2008 | Roberts | G06F 8/34 717/129 |
| 2010/0199265 A1* | 8/2010 | Maybee | G06F 11/3644 717/130 |
| 2011/0072309 A1* | 3/2011 | Sakai | G06F 11/362 714/35 |
| 2011/0154299 A1* | 6/2011 | Kim | G06F 11/3644 717/130 |
| 2011/0258614 A1* | 10/2011 | Tamm | G06F 11/3644 717/129 |
| 2011/0283265 A1* | 11/2011 | Gagliardi | G06F 11/3495 717/130 |
| 2012/0159451 A1* | 6/2012 | Bates | G06F 11/3664 717/125 |
| 2012/0246624 A1* | 9/2012 | Halliday | G06F 11/362 717/129 |
| 2012/0266139 A1* | 10/2012 | Bates | G06F 11/3664 717/125 |
| 2013/0159779 A1 | 6/2013 | Mickens | |
| 2013/0254749 A1* | 9/2013 | Sivalingam | G06F 11/3466 717/130 |
| 2014/0281722 A1* | 9/2014 | Kraipak | G06F 11/3648 714/34 |

* cited by examiner

Figure 7

ENABLING NON-BLOCKING RUNTIME APPLICATION DEBUGGING FOR A SINGLE THREADED SERVER ENVIRONMENT

BACKGROUND

The present disclosure relates to debugging server applications, and more specifically, to non-blocking runtime application debugging for a single threaded server environment.

Increasingly, JavaScript is gaining popularity for use on back end servers for web applications as JavaScript helps simplify real-time, two-way connections, where both the client and server can initiate communication through use of push technology over websockets. Additionally, JavaScript server runtime environments, such as Node.js, generally are event-driven and allow for non-blocking I/O mechanisms to handle data-intensive, real-time distributed applications, which help improve server performance, especially applications that have a high number of I/O operations.

However, unlike more traditional server runtime environments, which may spawn (e.g., create) a new thread for each connection request, JavaScript server runtimes may operate with a single threaded event loop. In such an environment, each incoming request is received by a single thread and passed on to background workers. This allows many time consuming I/O operations to operate concurrently in the background while the single thread proceeds.

When software bugs are encountered, debugging using a runtime debugger which allows, for example, pausing, examining, altering variables, and stepping through code may be useful. However, debugging operations in JavaScript server runtimes executing on the single thread presents challenges as debugging activity may stop operations on the single thread, blocking the execution of any new incoming requests or processing completed requests.

SUMMARY

According to one embodiment of the present disclosure, a method for runtime debugging server applications comprising obtaining a first request from a head of a request queue, processing the first request based on server application code under debugging, triggering, in response to the first request, a debugging procedure, pausing processing of the first request based on the debugging procedure, tagging the first request with an indication that the first request is in debugging, placing the first request back on the request queue in a position behind the head of the queue, storing debug information related to the first request, and executing at least a second request from the request queue while processing of the first request is paused.

According to another embodiment of the present disclosure, a system comprises a processor and a memory including a program which when executed by the processor, performs an operation comprising obtaining a first request from a head of a request queue, processing the first request based on server application code under debugging, triggering, in response to the first request, a debugging procedure, pausing processing of the first request based on the debugging procedure, tagging the first request with an indication that the first request is in debugging, placing the first request back on the request queue in a position behind the head of the queue, storing debug information related to the first request, and executing at least a second request from the request queue while processing of the first request is paused.

According to another embodiment of the present disclosure, a computer program product comprises a computer-readable storage medium having computer-readable program code embodied therewith, the computer-readable program code executable by one or more computer processors to perform an operation comprising obtaining a first request from a head of a request queue, processing the first request based on server application code under debugging, triggering, in response to the first request, a debugging procedure, pausing processing of the first request based on the debugging procedure, tagging the first request with an indication that the first request is in debugging, placing the first request back on the request queue in a position behind the head of the queue, storing debug information related to the first request, and executing at least a second request from the request queue while processing of the first request is paused.

DETAILED DESCRIPTION

Embodiments disclosed herein are directed to debugging server applications executing in a single threaded server environment in a non-blocking manner. As cloud environments become more common, there has been an increased interest in network applications that are highly scalable and fast (e.g., have a high throughput) when handling a large number of simultaneous connections. Conventional web servers, such as IIS or Apache generally handled new requests by creating new threads for each incoming request. Where the number of required threads increase as the number of requests increase, the memory footprint required by the web server increases as a function of the number of requests. The resulting memory footprint limits scalability of such web servers as the number of users increase.

JavaScript based servers, such as certain implementations of Node.js, help address this scalability issue by taking received requests and passing them to background workers, which actually execute the requests. When the background work finishes executing, a registered success callback is invoked to pass the results back. This registered callback, along with other code for processing the request may be executed in a single threaded event loop. As there is only a single process thread for the event loop, if this process thread is blocked, new requests are not received. Additionally, completed processes from worker threads are not received as the blocked event loop is unable to wait for and handle success callbacks. Runtime debugging on such JavaScript systems can be challenging as runtime debugging can stop execution of the event loop. Advantageously, embodiments described herein provide techniques for enabling non-blocking runtime debugging of applications in a single threaded server environment by selectively tagging and skipping requests.

As used herein, an "application" may refer to any executable program code, such as a job, workload, service, task, script, and the like, and may be of any suitable format, such as a binary file, executable, installer package, image, and the like.

Figure 1:
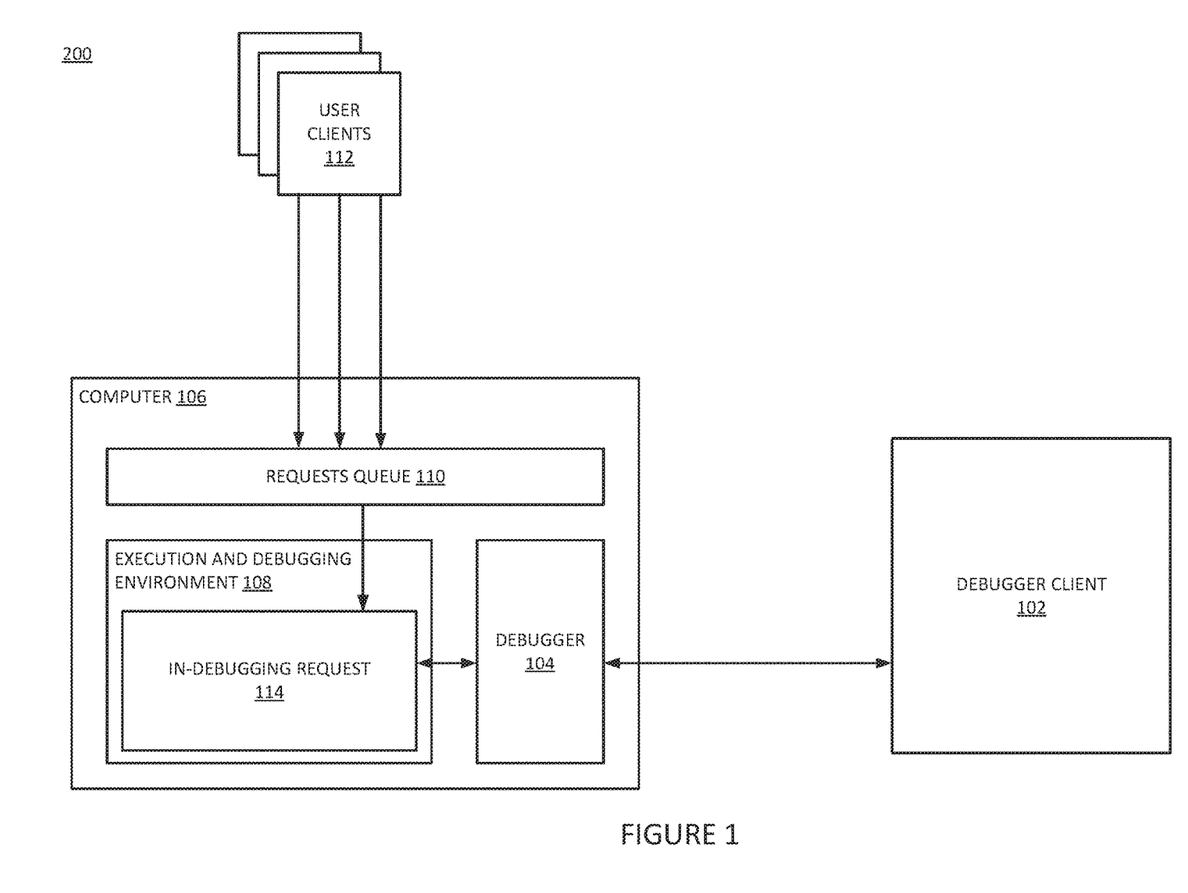
FIG. 1 illustrates a remote runtime debugging environment, according to aspects of the present disclosure.

FIG. 1 illustrates a remote runtime debugging environment 100, according to aspects of the present disclosure. The remote runtime debugging environment 100 includes a debugger client 102. The debugger client 102 may execute, for example, on a host computer separate from computer 106 and operates to display debugging information to a user as well as send commands to a debugger 104 via a network. The debugger 104 may execute on a computer 106 along with the execution and debugging environment 108, which is the environment in which the debugger executes the code being debugged and contains the debugging context information. According to certain aspects of the present disclosure, computer 106 is a JavaScript based web server, such as one implemented using Node.js. A requests queue 110 receives and queues requests received from user clients 112 in a first-in-first-out manner. The debugger 104 receives commands from the debugger client 102 and interfaces with the execution and debugging environment 108 as well as any request being debugged 114.

Runtime debugging in a production environment is an important tool for replicating and debugging software bugs as software systems become increasingly complex. Runtime debugging allows, for example, pausing, examining, altering variables, and stepping through executing code. A debugger 104 generally has two modes, a watch mode and a run mode. In watch mode, the debugger client 102 displays debugging information sent from the debugger 104 and in run mode, the debugger 104 runs lines of in-debugging code. Additionally, a debugger 104 may include an ability to set breakpoints by placing a special instruction in the executing code that causes the executing code to pause and allow the debugger 104 to hook into the code. If the debugger 104 encounters a breakpoint while running the in-debugging code in run mode, the debugger 104 will pause execution of the in-debugging code and collect and send debugging information to the debugger client 102.

As discussed above, JavaScript based servers may include a single-threaded event loop as well as multiple background worker threads. Where a breakpoint is set and hit in a worker thread, execution of the worker thread is paused, but other worker threads and the event loop continue executing.

While pausing execution of a particular background worker thread halts execution of that thread, pausing the execution of code executing on the event loop thread blocks the event loop for all requests. For example, a JavaScript based server application may take queued HTTP requests received from user clients 112 from the head of the requests queue 110 and execute the request. A debugging client 102 may be used, for example, to place a breakpoint in code for executing a particular request via a debugger 104. This code having the breakpoint executes on the event loop. The particular request to be processed by the code having the breakpoint is received from one of the user clients 112 and placed in the requests queue 110. Other requests received after the particular request are placed behind the particular request in the requests queue 110. The particular request is taken off the queue after it reaches the head of the queue and processed in the execution and debugging environment. When the breakpoint is hit, the debugger 104 stops execution of the in-debugging request 114, and collects debugging information to be sent to the debugger client 102. While execution on the event loop is paused, no messages are fetched off the requests queue until execution resumes and the server appears unresponsive to user clients 112. While the blocking behavior may not present an issue in a development server environment where debugging is expected. However, this blocking behavior presents challenges to runtime debugging in production server environments where servers may be user facing as the server appears unresponsive to user clients 112 during debugging.

According to aspects of the present disclosure, a tag may be attached to particular requests that are processed by code having a breakpoint (e.g., in debugging) to differentiate particular requests from other requests which are not being debugged. In run mode, a request is run until either the particular request is successfully processed or a breakpoint is hit. After the breakpoint is hit, debug information, such as the state of the in-debugging request, is collected and sent to the debugger client for display. The in-debugging request state information and debugging context information supporting the request state are stored into a debugging information storage for use in debugging. The in-debugging request is tagged and placed at the end of the requests queue. The debugger then enters watch mode and other requests in the execution queue are handled as usual, but tagged in-debugging requests are skipped and placed at the end of the queue as they are encountered at the head of the queue.

Figure 2:
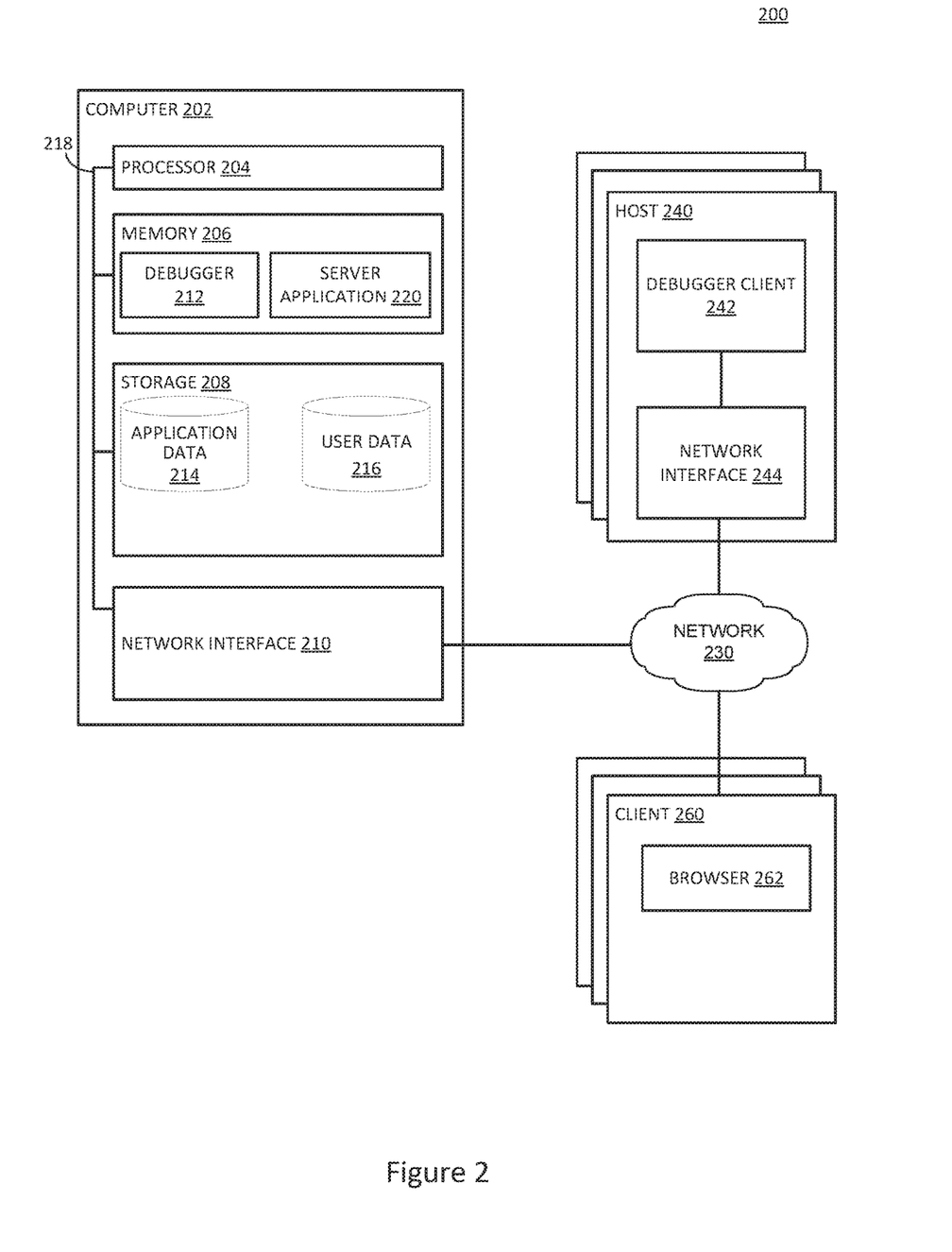
FIG. 2 illustrates a cloud computing environment configured to enable non-blocking runtime debugging of applications in a single threaded server, according to aspects of the present disclosure.

FIG. 2 illustrates a cloud computing environment 200 configured to enable non-blocking runtime debugging of applications in a single threaded server, according to aspects of the present disclosure. The cloud computing environment 200 includes a computer 202. The computer 202 may also be connected to other computers via a network 230. In general, the network 230 may be a telecommunications network and/or a wide area network (WAN). In a particular embodiment, the network 230 is the Internet.

The computer 202 generally includes a processor 204 which obtains instructions and data via a bus 218 from a memory 206 and/or a storage 208. The computer 202 may also include one or more network interface devices 210 connected to the bus 218. The computer 202 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 204 is a programmable logic device that performs instruction, logic, and mathematical processing, and may be representative of one or more CPUs. The processor may execute a debugger 212 and server application 220 in memory 206. The network interface device 210 may be any type of network communications device allowing the computer 102 to communicate with other computers via the network 230. The network interface 210 may exchange messages with the network 230.

The storage 208 is representative of hard-disk drives, solid state drives, flash memory devices, optical media, and the like. Storage 208 may also include structured storage, for example a database. Generally, the storage 208 stores application data 214 and user data 216 for use by the computer 202. In addition, the memory 206 and the storage 208 may be considered to include memory physically located elsewhere; for example, on another computer coupled to the computer 202 via the bus 218 or network 230. The application data 214 may include executable files for the application, attributes of the applications, versions of the applications, and the like. The user data 216 may also include user preferences and application data associated with specific users.

According to aspects of the present disclosure, the computer 202 may be one or more servers operating as a part of a server cluster. For example, computer 202 may operate as a frontend or application server may communicate with or in conjunction with other frontend, backend, data repository, or other type of server.

The hosts 240 are compute nodes configured to execute one or more debugger clients 242. The hosts 240 may include a network interface 244 through which the debugger client 242 may utilize for communications. Generally, debugger client 242 may be deployed in any suitable configuration. For example, debugger client 242 may execute on computer 202 as a process, or within the context of a virtual machine executing on computer 202. As shown, debugger client 242 executes on hosts 240, which are separate from computer 202.

One or more client 260 compute nodes may access the server application 220, for example through an internet browser 262 or other application via the network 230. The client 260 may issue various requests to the server application 220, for example utilizing standard protocols such as HTTP, AJAX, etc.

Figure 3A:
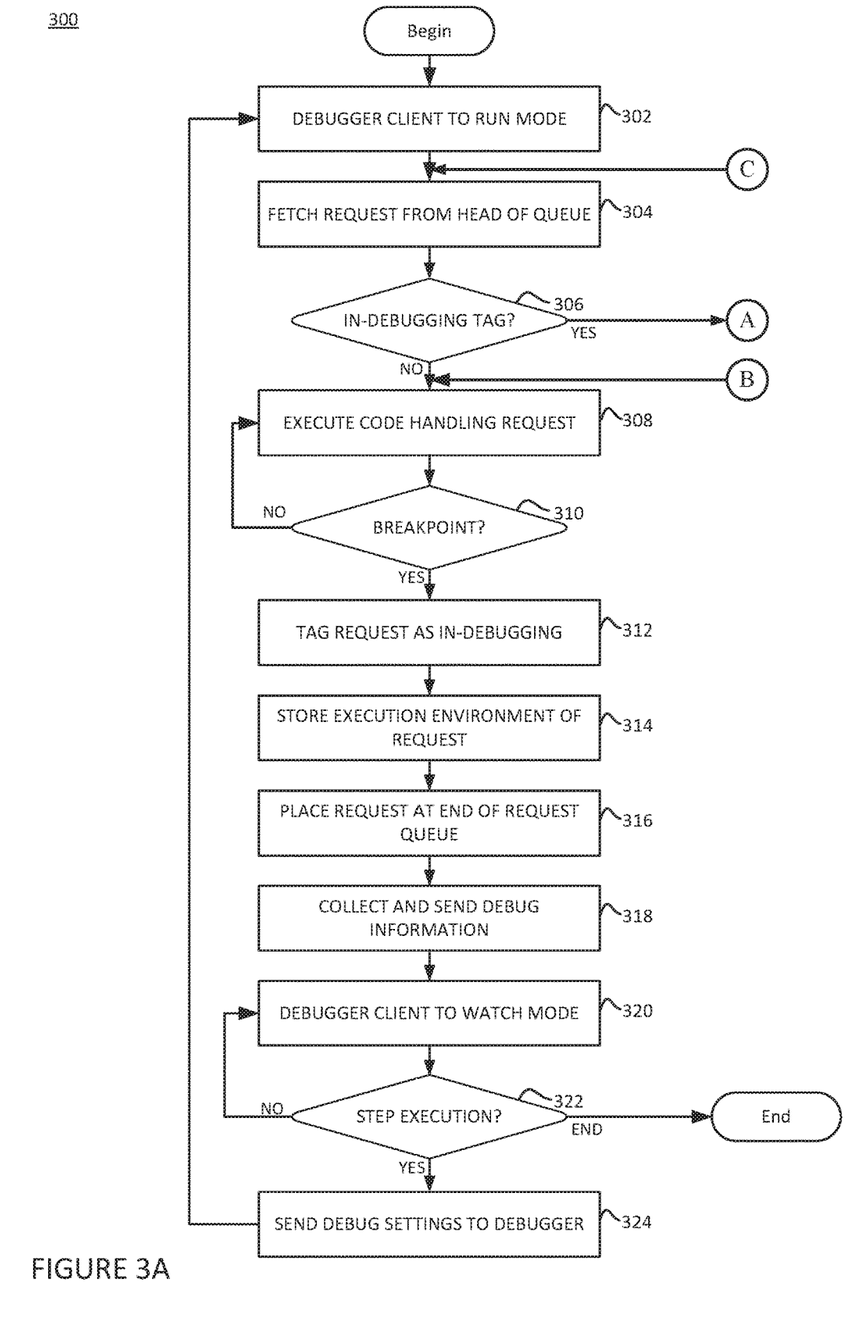
FIGS. 3A and 3B illustrate a method for non-blocking runtime debugging, according to aspects of the present disclosure.
Figure 3B:
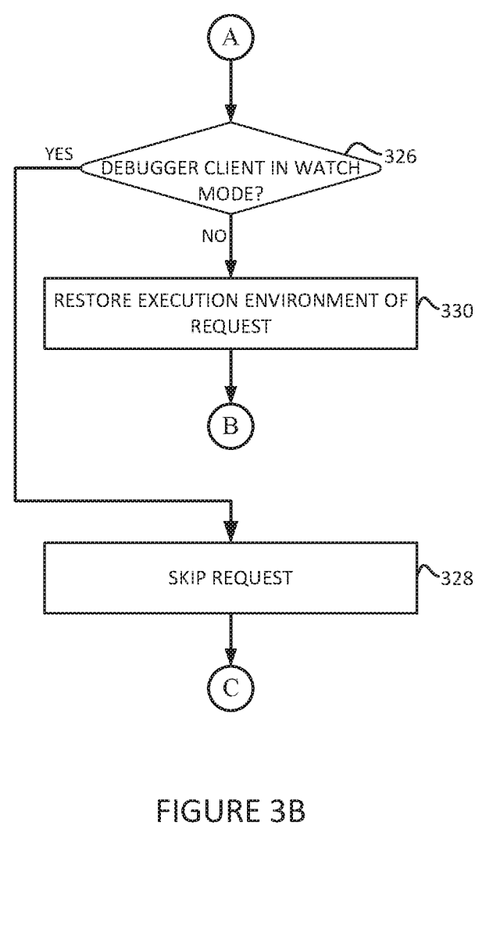

FIGS. 3A and 3B are a flow chart illustrating a method 300 for non-blocking runtime debugging, according to aspects of the present disclosure. A JavaScript server application may execute on a computer in a debugging mode and running within an execution and debugging environment with an attached debugger. The debugger may instrument the debugging environment and the server application with debug settings and set breakpoints set to trigger during processing of a particular request on an event loop. At 302, the debugger client is placed in run mode and execution of the server application proceeds. At 304, a request is fetched from the head of the requests queue. At 306, if the request does not have an in-debugging tag, the debugger executes the application code to handle the request at 308. At 310, execution proceeds until a breakpoint is reached.

When the breakpoint is reached at 312, the debugger obtains the current request object of the request being debugged from the debugging context of the execution and debugging environment, for example by retrieving the HTTP request object from the runtime environment. The debugger adds a tag to the request object, tagging the current request as an in-debugging request. For example, the debugger may retrieve the HTTP request object from a Node.js runtime environment and add a parameter (e.g., a tag), for example _inDebugging, to the request object and set the parameter value as true. At 314, the debugger collects and stores the execution environment of the request. As a part of storing the execution environment, the debugger collects information related to the current state of the in-debugging request. While the exact information sufficient to restore the state of the execution environment may vary for different kinds of servers, generally the information includes the current state of the request object and debugging context environment information supporting the current state of the request object. The execution environment information may be stored, for example in an in-debugging information storage space in memory.

At 316, the debugger moves the in-debugging request from the head of the requests queue to, for example, the end of the requests queue, allowing the server application to handle the next request without being blocked by the in-debugging request. The server application then proceeds to handle other requests on the requests queue.

According to aspects of the present disclosure, more generally, the in-debugging request may be moved from the head of the queue to later in the queue rather than to the end. This, for example, may allow for request prioritization where higher priority requests may be moved down the queue but not to the end so they are handled sooner than if the request were moved to the end.

At 318, the debugger collects and sends the debugging information to the debugger client for display. At 320, the debugger client is placed into watch mode and the debugger client waits for a debugging developer to trigger step execution. The debugger client may then display the server application code as if paused at the breakpoint with the associated debug information. If, at 322, the debugging developer ends debugging, for example by detaching the debugger, removing the breakpoint or otherwise ending debugging, then debugging ends. If the debugging developer triggers step execution at 322, the debugger client sends debug settings to the debugger. These debug settings may include an indication to step through the code, updated variable values, or other changes made by the debugging developer. Any changes made by the debugging developer may be used by the debugger to reinstrument the debugging environment or server application. The debugger client is set to run mode at 302 and execution proceeds until the tagged request is fetched from the head of the requests queue at 304.

At 306, the debugger determines that a particular request has a tag indicating that the request is in-debugging and at 326 of FIG. 3B, the debugger client is checked to determine whether the debugger client is in watch mode. If the debugger client is not in watch mode, the debugger restores the execution environment of the request at 330. Any changes made by the debugging developer to the debug settings are also restored. At 308, the tagged request is executed in context with the restored execution environment by code for handling the request. If another breakpoint is hit, the other breakpoint is handled in a manner similar to that discussed above in conjunction with 312.

According to aspects of the present disclosure, a tagged request previously placed further back in the requests queue may be fetched from the head of the requests queue at 304 as other requests are removed and handled. At 306, a determination as to whether the tagged request is tagged may be performed. If the debugger client is in watch mode at 326, for example if the debugger client is displaying code and debugging information and the debugging developer has not yet triggered a step operation, then at 328, execution of code for handling the tagged request is skipped. The tagged request is removed from the head of the requests queue placed further back in the request queue, suspending the tagged request in the requests queue. The server application then proceeds to handle other requests in the requests queue.

According to aspects of the present disclosure, where multiple requests are tagged as in-debugging, a first tagged request may be in display by the debugger client when a second tagged request is fetched from the head of the requests queue at 304 and determined to be tagged at 306. Execution of code for handling the second tagged request is skipped and the second tagged request is removed from the head of the requests queue and placed further back in the requests queue. The server application then proceeds to handle other requests in the requests queue. Additionally, a condition may be added to the breakpoint to filter requests such that only certain requests may hit the breakpoint. A binding mechanism may also be added, binding the watch mode with a unique request ID, for example at step 320, and then checking for the unique request ID such that only the first request being watched for is suspended in the requests queue.

Figure 4:
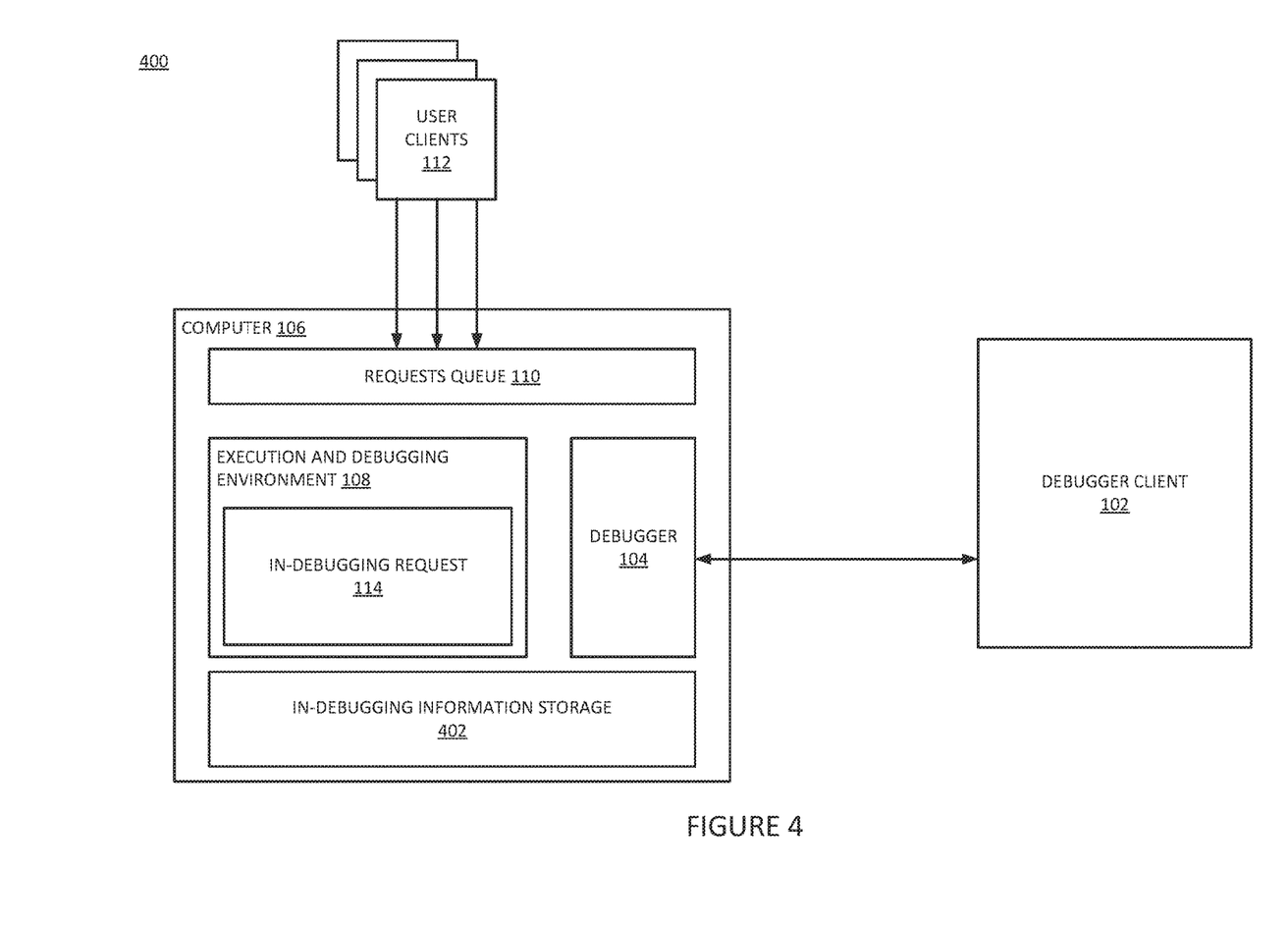
FIG. 4 illustrates a remote runtime debugging environment for non-blocking runtime application debugging, according to aspects of the present disclosure.

FIG. 4 illustrates a remote runtime debugging environment 400 for non-blocking runtime application debugging, according to aspects of the present disclosure. As before, the debugger client 102 may interface with a debugger 104 executing on a computer 106 along with the execution and debugging environment 108 and requests queue 110. As discussed above, a request to be debugged may be tagged, placed at the end of the requests queue, and the execution environment of the request stored. This execution environment, including the current state of the request object and debugging context environment information supporting the current state of the request object, may be stored in an in-debugging information storage 402. The in-debugging information storage may be an in-memory storage separate from memory used by the server application and operated on by the debugger.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

For convenience, the Detailed Description includes the following definitions which have been derived from the "Draft NIST Working Definition of Cloud Computing" by Peter Mell and Tim Grance, dated Oct. 7, 2009, which is cited in an IDS filed herewith, and a copy of which is attached thereto.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
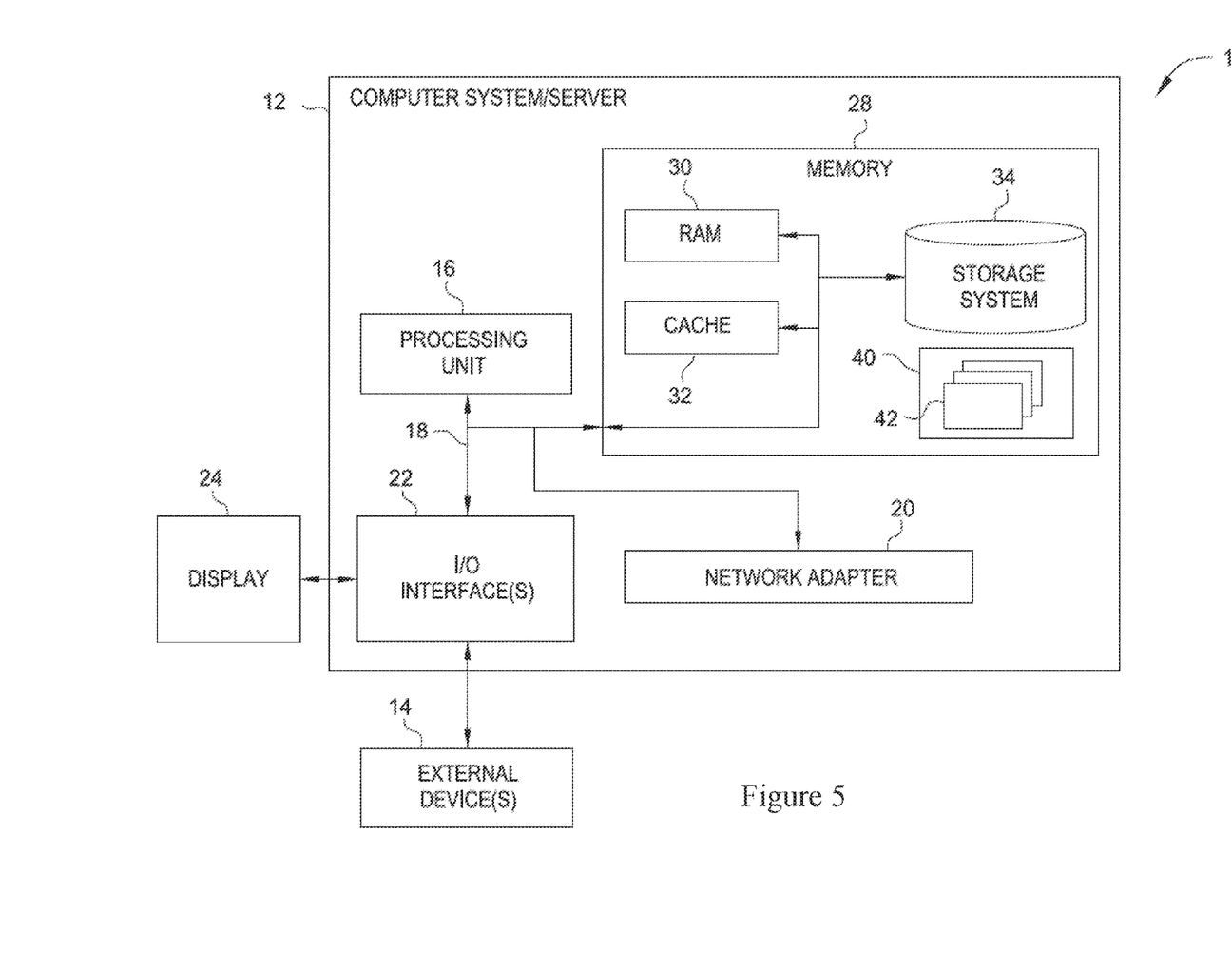
FIG. 5 depicts a cloud computing node according to one embodiment.

Referring now to FIG. 5, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 6:
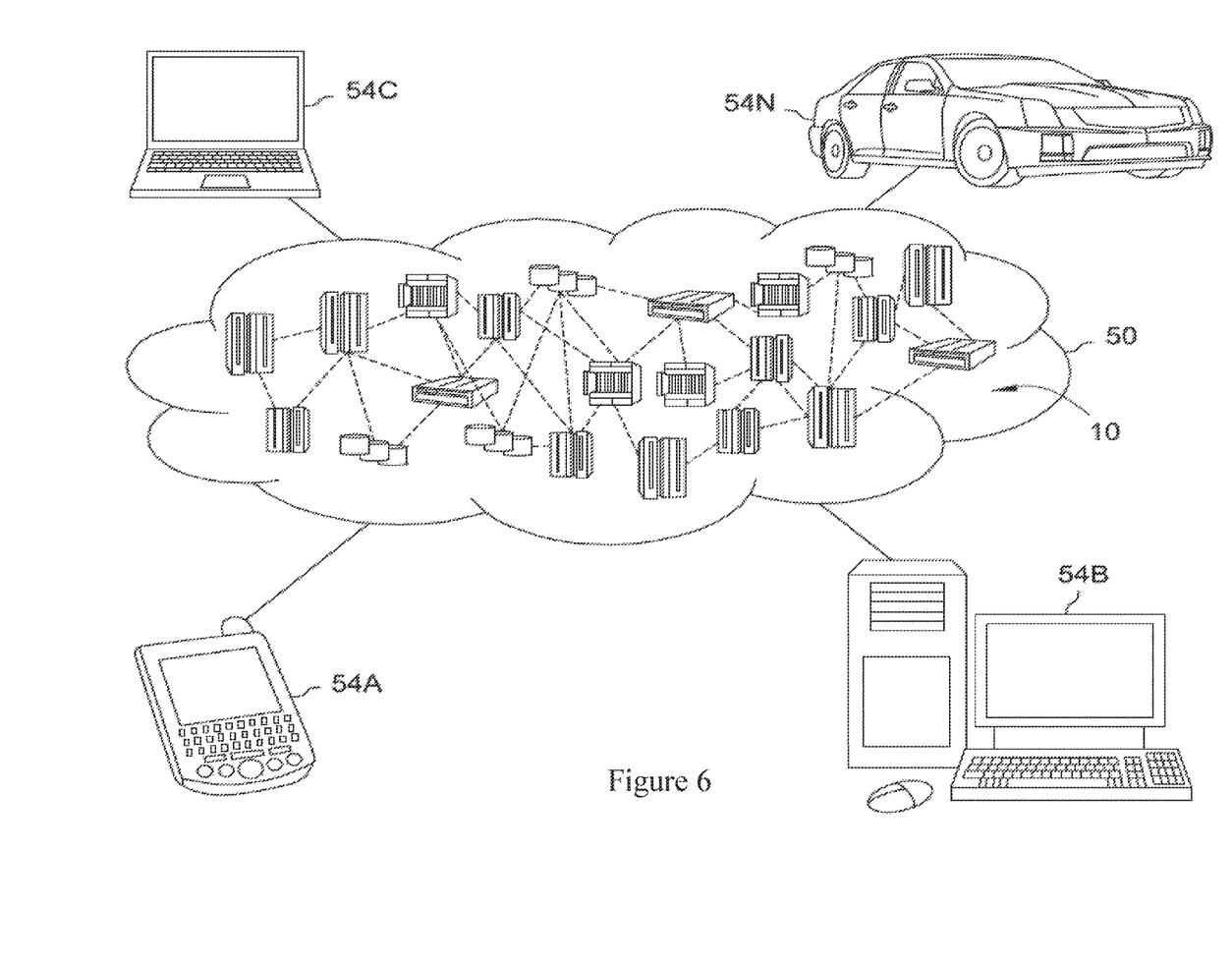
FIG. 6 depicts a cloud computing environment according to one embodiment.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
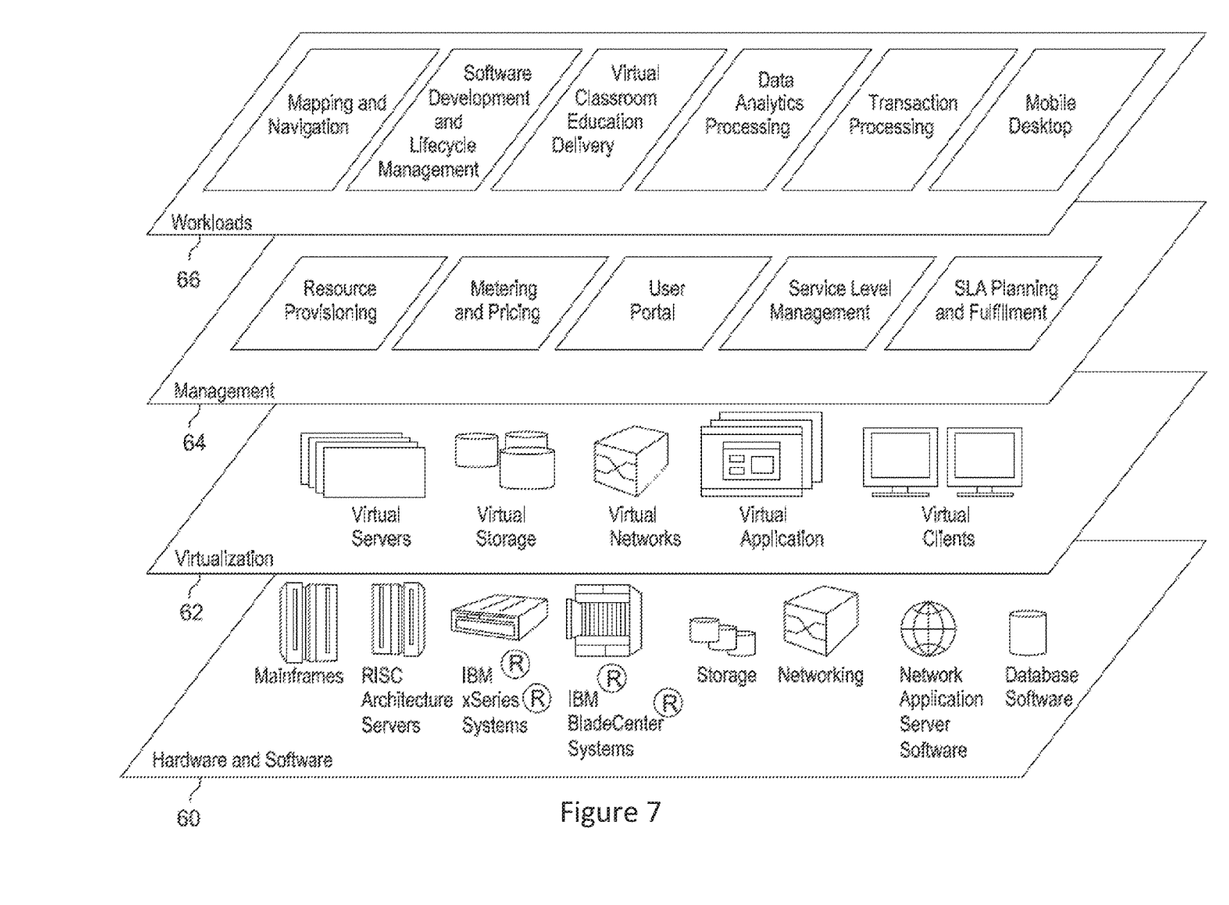
FIG. 7 depicts abstraction model layers according to one embodiment.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. The resource provisioning may be based on an analysis of the requested job/application and the cloud computing environment itself, as described above. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

Embodiments of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method for runtime debugging server applications, the method comprising:
    obtaining a first request from a head of a request queue;
    processing the first request based on server application code under debugging;
    triggering, in response to the first request, a debugging procedure;
    pausing processing of the first request based on the debugging procedure;
    tagging the first request with an indication that the first request is in debugging;
    placing the first request back on the request queue in a position behind the head of the request queue;
    storing debug information related to the first request;
    processing at least a second request from the request queue while processing of the first request is paused;
    transmitting debugging information related to the first request to a debugger client;
    obtaining a tagged request from the head of the request queue;
    determining the debugger client is in a watch mode;
    placing the tagged request back on the request queue in a position behind the head of the request queue without execution of code for handling the tagged request;
    receiving modified debug settings from the debugger client;
    restoring an execution environment based on the stored debug information and modified debug settings; and
    executing code for handling the first request.

2. The method of claim 1, wherein placing the first request back on the request queue comprises placing the first request at an end of the request queue.

3. The method of claim 1, further comprising:
    receiving an indication from the debugger client for resuming code execution;
    obtaining a tagged request from the head of the request queue;
    restoring an execution environment based on the stored debug information; and
    executing code for handling the tagged request.

4. The method of claim 1, wherein storing debug information related to the first request comprises storing information related to request state information and debugging context information.

5. A system for runtime debugging server applications, the system comprising:
  one or more computer processors;
  a memory containing a program which when executed by the one or more computer processors performs an operation, the operation comprising:
    obtaining a first request from a head of a request queue;
    processing the first request based on server application code under debugging;
    triggering, in response to the first request, a debugging procedure;
    pausing processing of the first request based on the debugging procedure;
    tagging the first request with an indication that the first request is in debugging;
    placing the first request back on the request queue in a position behind the head of the request queue;
    storing debug information related to the first request;
    processing at least a second request from the request queue while processing of the first request is paused;
    transmitting debugging information related to the first request to a debugger client;
    receiving an indication from the debugger client for resuming code execution;
    obtaining a tagged request from the head of the request queue;
    restoring an execution environment based on the stored debug information;
    executing code for handling the tagged request;
    receiving modified debug settings from the debugger client;
    restoring an execution environment based on the stored debug information and modified debug settings; and
    executing code for handling the first request.

6. The system of claim 5, wherein placing the first request back on the request queue comprises placing the first request at an end of the request queue.

7. The system of claim 5, the operation further comprising:
  obtaining a tagged request from the head of the request queue;
  determining the debugger client is in a watch mode; and
  placing the tagged request back on the request queue in a position behind the head of the request queue without execution of code for handling the tagged request.

8. The system of claim 5, wherein storing debug information related to the first request comprises storing information related to request state information and debugging context information.

9. A computer program product comprising:
  a computer readable storage medium having computer-readable program code embodied therewith, the computer-readable program code for runtime debugging server applications, comprising:
  computer-readable program code configured to:
    obtain a first request from a head of a request queue;
    process the first request based on server application code under debugging;
    trigger, in response to the first request, a debugging procedure;
    pause processing of the first request based on the debugging procedure;
    tag the first request with an indication that the first request is in debugging;
    place the first request back on the request queue in a position behind the head of the request queue;
    store debug information related to the first request;
    process at least a second request from the request queue while processing of the first request is paused;
    transmit debugging information related to the first request to a debugger client;
    receive modified debug settings from the debugger client;
    restore an execution environment based on the stored debug information and modified debug settings; and
    execute code for handling the first request.

10. The computer program product of claim 9, wherein placing the first request back on the request queue comprises placing the first request at an end of the request queue.

11. The computer program product of claim 9, the computer-readable program code further configured to:
  obtain a tagged request from the head of the request queue;
  determine the debugger client is in a watch mode; and
  place the tagged request back on the request queue in a position behind the head of the request queue without execution of code for handling the tagged request.

12. The computer program product of claim 9, the computer-readable program code further configured to:
  receive an indication from the debugger client for resuming code execution;
  obtain a tagged request from the head of the request queue;
  restore an execution environment based on the stored debug information; and
  execute code for handling the tagged request.

* * * * *